(12) United States Patent
Raike, III et al.

(10) Patent No.: US 8,672,339 B2
(45) Date of Patent: *Mar. 18, 2014

(54) SAND-RIDEABLE BICYCLE

(71) Applicants: William J. Raike, III, Woodstock, GA (US); Gene Langmesser, Aliso Viejo, CA (US)

(72) Inventors: William J. Raike, III, Woodstock, GA (US); Gene Langmesser, Aliso Viejo, CA (US)

(73) Assignee: All Terrian Bike, Inc., Woodstock, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/694,759

(22) Filed: Jan. 2, 2013

(65) Prior Publication Data

US 2013/0119631 A1    May 16, 2013

Related U.S. Application Data

(63) Continuation of application No. 13/317,389, filed on Oct. 17, 2011, now Pat. No. 8,382,135.

(51) Int. Cl.
  *B62K 3/06*  (2006.01)
  *B62M 29/00*  (2006.01)
  *B60C 11/03*  (2006.01)

(52) U.S. Cl.
  USPC ............. 280/281.1; 280/12.14; 280/282; 152/209.11; 152/209.15; 152/209.22

(58) Field of Classification Search
  USPC ........... 280/28.5, 281.1, 12.14, 282; 180/205, 180/219; 73/146; 301/52, 43; 152/209.12, 152/209.13, 209.22, 209.11, 209.15
  See application file for complete search history.

(56) References Cited

U.S. PATENT DOCUMENTS

| | | | | |
|---|---|---|---|---|
| 1,225,459 | A * | 5/1917 | Mauk | 152/209.17 |
| 2,787,970 | A * | 4/1957 | Bennett | 105/95 |
| 3,542,145 | A * | 11/1970 | Proffer | 180/219 |
| 3,710,883 | A * | 1/1973 | Rizzo | 180/208 |
| 4,132,428 | A * | 1/1979 | Lassiere | 280/278 |
| 4,341,249 | A * | 7/1982 | Welter | 152/516 |
| 4,909,537 | A * | 3/1990 | Tratner | 280/278 |
| 5,178,088 | A * | 1/1993 | Howard | 440/12.62 |
| 5,474,144 | A * | 12/1995 | Tarng | 180/76 |
| D545,245 | S * | 6/2007 | Masera | D12/111 |
| 7,597,331 | B2 * | 10/2009 | Schulte et al. | 280/7.15 |
| 2005/0029031 | A1 * | 2/2005 | Thomas | 180/205 |
| 2006/0108768 | A1 * | 5/2006 | I et al. | 280/281.1 |
| 2007/0222278 | A1 * | 9/2007 | Hoisington | 301/58 |

* cited by examiner

*Primary Examiner* — Paul N Dickson
*Assistant Examiner* — Daniel Yeagley
(74) *Attorney, Agent, or Firm* — Thomas | Horstemeyer, LLP

(57) ABSTRACT

An unmotorized sand-rideable bicycle utilizes oversized balloon tires that have an enlarged footprint to permit the bicycle to ride up over even loose sand to provide ease of pedaling as well as enhanced steering and stability over that associated with standard bicycles.

8 Claims, 6 Drawing Sheets

SAND-RIDEABLE BICYCLE

RELATED APPLICATIONS

This is a continuation of co-pending U.S. application Ser. No. 13/317,389 filed on Oct. 17, 2011 the contents of which are hereby incorporated by reference.

FIELD OF THE INVENTION

This invention relates to bicycles and more particularly to a sand-ride able bicycle with oversized tires, the large footprint of which prevents the tires from sinking into the sand.

BACKGROUND OF THE INVENTION

With the growth of an aging population especially in retirement communities around beaches, there is a requirement that the individual be able to ride a bike from his or her residence to a beach and be able to traverse the beach on the bicycle without undo propulsion and balance problems.

While dune buggies and like motorized vehicles exist, there is a problem with utilizing standard bicycles on a beach due to the difficulty in riding such a bike, including getting it going, and also steering it as well as keeping it upright. This is because on loose sand as well as in wet sand conditions the effort to propel the bike is often insurmountable with other than Herculean effort.

The obvious reason is that the bike tires of a conventional bicycle sink into the dry sand making propulsion, balancing and steering impossible for a large number of individuals. It turns out that the peddling on dry sand is exceedingly difficult, requiring extreme use of leg strength even in the lowest gear.

Moreover, balancing a traditional bike on sand is difficult due to the sands unstable foundation.

Even with compacted dry sand, while there is considerable difficulty in starting up, once movement is commenced it is less difficult to stay balanced and ride for a considerable distance. However, even with dry compacted sand standard bicycles sink into the sand for as much as two inches. Moreover, even if one can propel the bicycle, steering is difficult in any direction aside from straightforward due to the sinkage into the top layer of sand, for instance on an average of 1½ inches.

On wet or semi compacted sand a conventional bicycle is likewise difficult to peddle and steer. Stopping and starting repeatedly over for instance a distance of 10 to 12 feet is difficult due to the inability to get the bike started again, requiring great strength. Moreover in wet or semi compacted sand the rear tire of the bicycle does not achieve good traction. Additionally, on wet and compacted sand front tire sliding is a cause for bike instability resulting in the impossibility of an individual to balance on the bike.

Thus for conventional bikes, even those defined as mountain bikes, riding on sand be it loose sand, dry compacted sand, or wet and semi compacted sand is exceedingly difficult under human-power. Even if motorized attachments are made to the bicycle, balancing and steering is still a problem, with the motorization only solving the propulsion problem. Note, the majority of beaches do not allow motorized vehicle to be driven on the beaches except by law enforcement personnel.

While motorized dune buggies and the like have been provided in the past, it will be appreciated that these vehicles are four wheel vehicles which have a four point stance and therefore are relatively stable. These vehicles are not readily adapted for human peddling and were devised because of the inability to take a conventional bicycle and peddle it through the sand. Thus, drivability of conventional bicycles over various beach conditions has proved either impossible or very difficult at best.

There is therefore a need for a different bicycle design that can be peddled by a human being with ease, in which propulsion, steering and balance problems are minimized.

SUMMARY OF INVENTION

In one embodiment of the subject invention, a sand-rideable bicycle is provided with oversized tires such that the footprint of the tire is expanded considerably over that associated with standard bicycles. Note, the footprint of a standard mountain bike is on the order of 2 inches in width with a 210 lb rider. On the other hand, in one embodiment the footprint of an oversized tire with a 210 lb rider is on the order of 8×12 inches. Note also that riderless standard mountain bikes have a footprint width of 1¾ inch, whereas the subject balloon tires have a riderless footprint width of 6 inches.

The result is that the tire does not sink into the sand to any great extent, thus permitting peddling without the resistance of having to push aside a large amount of sand as one rides. Secondly, the oversized tires provide increased steering ability due to the relatively fat flattened footprint as the front tire meets the sand. This is coupled with rear tire stability that prevents the sideways motion associated with a conventional bike tire making its way through loose or compacted sand.

The oversized tires and in some cases the under inflation of the tire permits the individual to initiate peddling and steering without the strength normally utilized to peddle a conventional bike through sand. The reason that the initial peddling is made easier is that the amount of sand that needs to be displaced for the bicycle to move forward is minimized, thus permitting the gyroscopic action of the wheels to take effect as the bike moves forward, thus aiding in stability.

In one embodiment, the width of the tires is between 6" and 8" and the inflation of the tires is between 15# and 25# for tires having a diameter of 26" to 27" outside diameter.

As part of the subject invention, a lightweight open split frame is utilized in which the frame viewed from the top has a diamond shape. In this embodiment the peddles are laterally displaced to either side of the split frame, with the chain drive sprocket existing totally within the frame, as opposed to on the side as with conventional bicycles.

This lateral spacing of the peddles to either side of the bifurcated frame permits easier peddling and balancing due to the wider stance when peddling.

Additionally, the frame may be made partially of metal alloy and partially of carbon fiber, with the carbon fiber being utilized for the fork that is utilized to support the front wheel. The remainder of the bicycle in one embodiment is made of titanium due to its light weight. Moreover, titanium limits corrosion associated with salt air and one does not have to paint the titanium frames. Any logos or the like may be applied to the titanium frames as stickers.

Moreover, in one embodiment, the rear drive tire is provided with an annular ridge that rises up above the lateral ridges used for propelling the bike forward. This permits the bike to be ridden on normal streets without the clatter associated with the rather large lateral ridges used for sand propulsion. As a result it is possible for an individual to ride comfortably from one's residence to the beach and onto the beach, with the bike being supported above its laterally running rear tire ridges by the annular protruding ridge.

In one embodiment, only two to three gears (low, med, high) are provided for the forward propulsion of the bicycle, namely a low gear ratio to be utilized when peddling through sand and a larger gear ratio to be utilized when peddling the bicycle along a street or walkway. In one embodiment, the low gear ratio is on the order of 1.5:1. This is accomplished in one embodiment through a 25.5 inch drive sprocket gear which for 500 revolutions permits one to go 1000 meters given an outside wheel diameter of 26".

In one embodiment, the width of the forward wheel is between 4-6 inches and the width of the rear wheel is on the order of 8 inches, with the tire in one embodiment having a 26 to 27 inch outside diameter.

In the above embodiment one has a difference in width on the tires because there is very little weight on the front tire, with most of the weight being born by the rear tire when one is sitting on the bicycle seat.

It is desirable to keep the tire weight to a minimum and have a differential in width between the front and the back tires to minimize weight. However, the width of the tire cannot be decreased so much as to result in the tire penetrating deep into the sand which limits drivability.

Moreover, rather than utilizing the normal 35 pounds of tire pressure, in one embodiment the tire pressure is reduced to 15 pounds so as to increase the footprint of the tire on the sand, thereby limiting the penetration of the tire into the sand. This also prevents sideways motion as little sand is kicked off to either side of the tire.

Additionally, in another embodiment the rear tire is composed of two side-by-side tires that increases balance and stability while at the same time providing for an even wider footprint. Since two tires are separated a sprocket gear may be provided in between. Since the main drive sprocket gear is located centrally in the frame, it can be lined up with the sprocket gear between the two tires.

Returning now to the gear ratios, it will be appreciated that a 1:1 gear ratio means that one is peddling at full revolution of the peddles for maybe a quarter of a stride of a walk. What this means is that one has to peddle four revolutions to equal one stride. This means that the gear ratio of 1:1 is somewhat low. It has been found that a 1.5:1 ratio is satisfactory for low gear.

In summary, the above gear ratio is sufficient and low enough to where anyone of average strength can peddle the bike because of the tire not sinking into the sand, even when one encounters a bit of soft sand. Moreover, drivability is enhanced because of the low gear ratio, the bicycle's agility and lightness enables one to propel oneself forward with ease, with the size of the balloon tires helping with propulsion and balance. It is noted as long as one can move forward, one can continue to maintain ones balance.

One of the desirable features of the subject bicycle is to create a machine that an overweight person can utilize on a beach. Retirees are not necessarily in the best of shape and may be overweight, with the subject bicycle replacing walking as convenient and enjoyable exercise so that the retiree can ride up and down the beach, get the same exercise as walking, go a lot faster and burn more calories.

In short, the oversized or balloon tires and their enlarged footprint permit the bicycle to ride over even loose sand, while at the same time aiding in steering and stability.

BRIEF DESCRIPTION OF THE DRAWINGS

These and other features of the subject invention will be better understood in connection with the Detailed Description, in conjunction with the Drawings, of which:

FIG. 4 is a cross sectional and diagrammatic illustration of the rear balloon tire of FIG. 1 illustrating the laterally running ridges used for the propulsion of the bicycle, also illustrating the annular circumferential ridges that permit riding of the bicycle on streets, pavement and the like.

DETAILED DESCRIPTION

Prior to describing the functionality and the operation of the subject sand-rideable bicycle, the following relates to research data collected when several different individuals were instructed to use a mountain bike and more particularly a mountain bike called a Motive Ground Pounder having an aluminum suspension frame in which the particulars of the test are listed below:

Subjects

Difficulty of riding was tested by four participants:
1.) male, 53 years old, 210 lbs, 5'11"
2.) male, 19 years old, 170 lbs, 5'9"
3.) male, 16 years old, 130 lbs, 5'9"
4.) female, 43 years old, 117 lbs, 5'1"

Measures

Three conditions were tested: dry/loose sand; dry/compacted sand; wet/semi-compacted sand. Each condition was attempted for three tries each subject and the arithmetic mean was taken.

Findings

The bike was very difficult to ride, steer, and keep upright for all subjects in dry, loose sand as well as wet sand conditions. In compacted sand conditions the riding ability more then doubled but was still difficult to steer.

Dry/Loose Sand:
the sinking into the dry sand made steering impossible for all subjects for a measurable distance. Conditions for peddling on dry sand were difficult and required extreme use of leg strength even in lowest gear. Balancing the bike was difficult due to the sand's unstable foundation.

Dry/Compacted Sand:
subjects differed in ability to ride in compacted sand. Subject 1.) difficulty in starting but once movement was commenced, it was less difficult to stay balanced and could ride for a considerable distance; sunk into sand layer for 2 inches;

Performance of subject 3.) was notably better than rest of subjects. Could balance, but still had difficulty steering bike in any direction aside straight forward and sunk into top layer of sand on an average of 1½ inches; could ride it for considerable distance. Subject 2.) and 4.) had comparable results to subject 1.)

Wet/Semi-Compacted Sand:

Subject 1.) had difficulty peddling and steering; very difficult to pedal and steer; Stop and start repeatedly over a length of 10-12 feet, but able to ride with extreme difficulty and great use of strength required. Rear tire sunk only 1 inch into the sand but due to sand's moisture level good traction was not achieved. Front tire sliding and cause for impossible to balance condition.

Subject 2.) and 3.) difficult in pedaling and steering; unable to consider ease to ride for more than 20 feet measurable length continuously; rear tire sunk 1¾ inch into the sand; front tire was uncontrollable for steering.

Subject 4.) unable to ride—lack of strength to initiate pedaling and steering for any measurable length.

Conclusion

The mountain bike was difficult to pedal or was unusable in the above listed sand conditions.

The Sand-Rideable Bicycle

Figure 1:
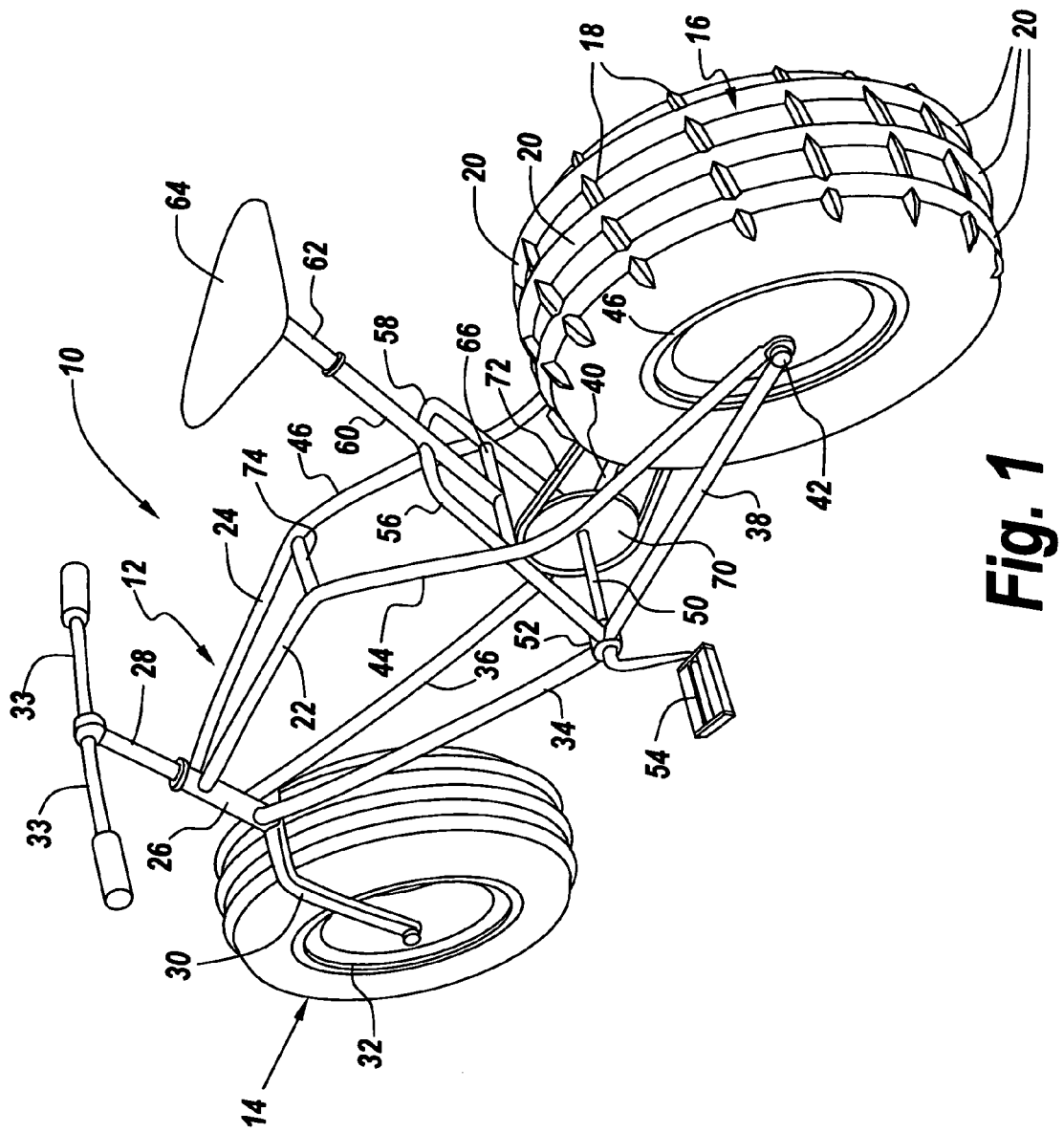
FIG. 1 is an isometric view of the subject sand-rideable bicycle indicating oversized tires, an open frame enclosing the drive gear in which the rear tire is provided with an annular ridges that extend beyond lateral propulsion ridges to permit riding of the bicycle on pavement.

With the difficulty of riding conventional bicycles in sand, and referring now to FIG. 1, a sand-rideable bicycle 10 includes a frame 12 on which are supported balloon tires 14 and 16, with the forward tire containing circumferential ridges for tracking and in which the rear tire 16 is provided with propulsion ridges 18 that run transverse to the direction of travel of the bicycle. Also shown is a circumferential ridge 20 which extends above the lateral ridges 18 so that when the bicycle is ridden over asphalt, concrete or the like there is no jarring action to the rider.

However, when riding on a soft sand surface ridges 18 provide sufficient dig and propulsive force to be able to propel the individual on the bicycle forward even through the softest and most loosely packed of sand.

It is noted that the frame for the subject sand-rideable bicycle is an essentially diamond shaped frame in which bifurcated upper struts 22 and 24 extend from a column 26 adapted to house a steering shaft 28 to which handles 30 are attached as shown.

Shaft 28 is provided with an expanded fork 33 having a width to accommodate the oversized wheel or hub 32 onto which balloon tire 14 is mounted.

Bifurcated lower struts 34 and 36 are spaced from struts 22 and 24 and extend from column 26 rearwardly towards wheel 16, with lower strut extensions 38 and 40 running to a hub 42 of wheel 46 which is used to mount the rear balloon tire.

Likewise extensions of struts 22 and 24, here illustrated at 44 and 46 are angled downwardly, with their distal ends meeting the ends of struts 38 and 40 to form a collar for the axel of oversized rear tire.

As illustrated, a drive sprocket axel 50 is mounted transverse to the frame through the use of collars 52, with axel 50 rotated by peddles 54 that extend to either side of the expanded frame.

As can be seen, seat mounting struts 56 and 58 extend upwardly from associated collars 52 where they are affixed to a tubular member 60 that is used to telescopically house a cylindrical shaft 62 which is capped by a seat 64.

The bottom of tubular member 60 is supported by a transverse spar 66 welded at either end to struts 56 and 58, with transverse spar 66 being welded to the bottom of tubular member 60 as illustrated.

It will be noted that axel 50 carries a drive sprocket or gear 70 which is housed totally within the frame structure and rests, not outside of the frame structure, but within it.

Figure 2:
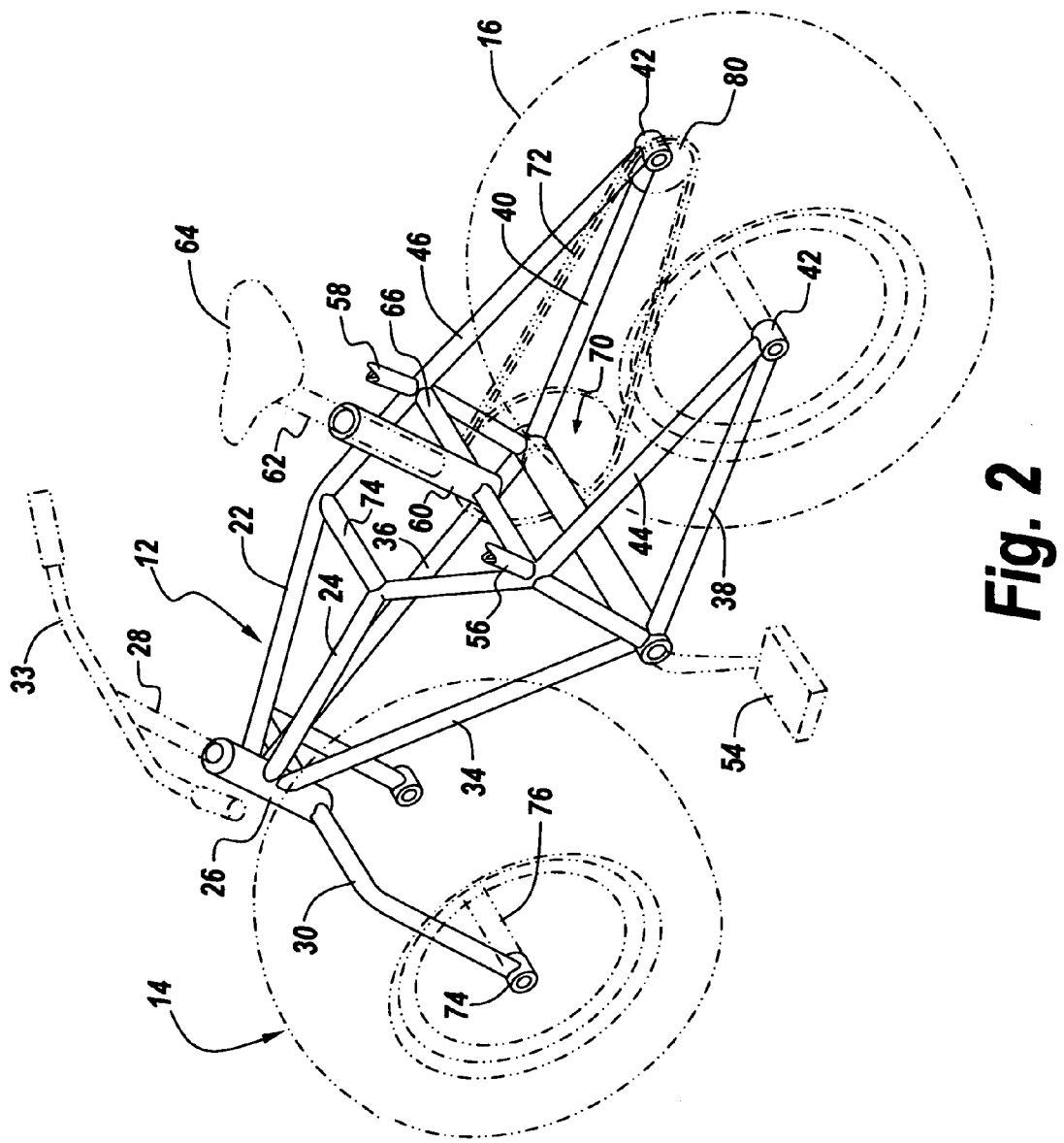
FIG. 2 is a diagrammatic illustration of the frame of the sand-rideable bicycle in FIG. 1 in which the frame accommodates oversized tires while at the same time providing a diamond shaped open structure for the attachment of a seat and for the mounting of a drive sprocket within the frame and actuated by foot peddles.

As shown in FIG. 2, a drive chain 72 is illustrated which is utilized to drive a sprocket 80 on rear wheel 16 such that the bicycle with the balloon tires is peddleable without a power assist by a wide variety of individuals seeking to ride the bike on a sand beach.

Referring back to FIG. 1, it is also noted that a spacer 74 is used to space the bifurcated struts 22 and 24 to maintain the bifurcated struts 22 and 24 in place.

Referring again to FIG. 2 where front tire 14 and rear tire 16 is shown in dotted outline, the various components of the diamond shaped frame are illustrated in which like elements have like reference characters between FIGS. 1 and 2.

Here it can be seen that fork 30 has enough clearance to accommodate front tire 14, with the fork shown here attached to front tire 14 through sleeves 75 into which fit a front tire axel 77.

In this picture sprocket 70 drives rear wheel sprocket 80 shown here in dotted outline.

Figure 3:
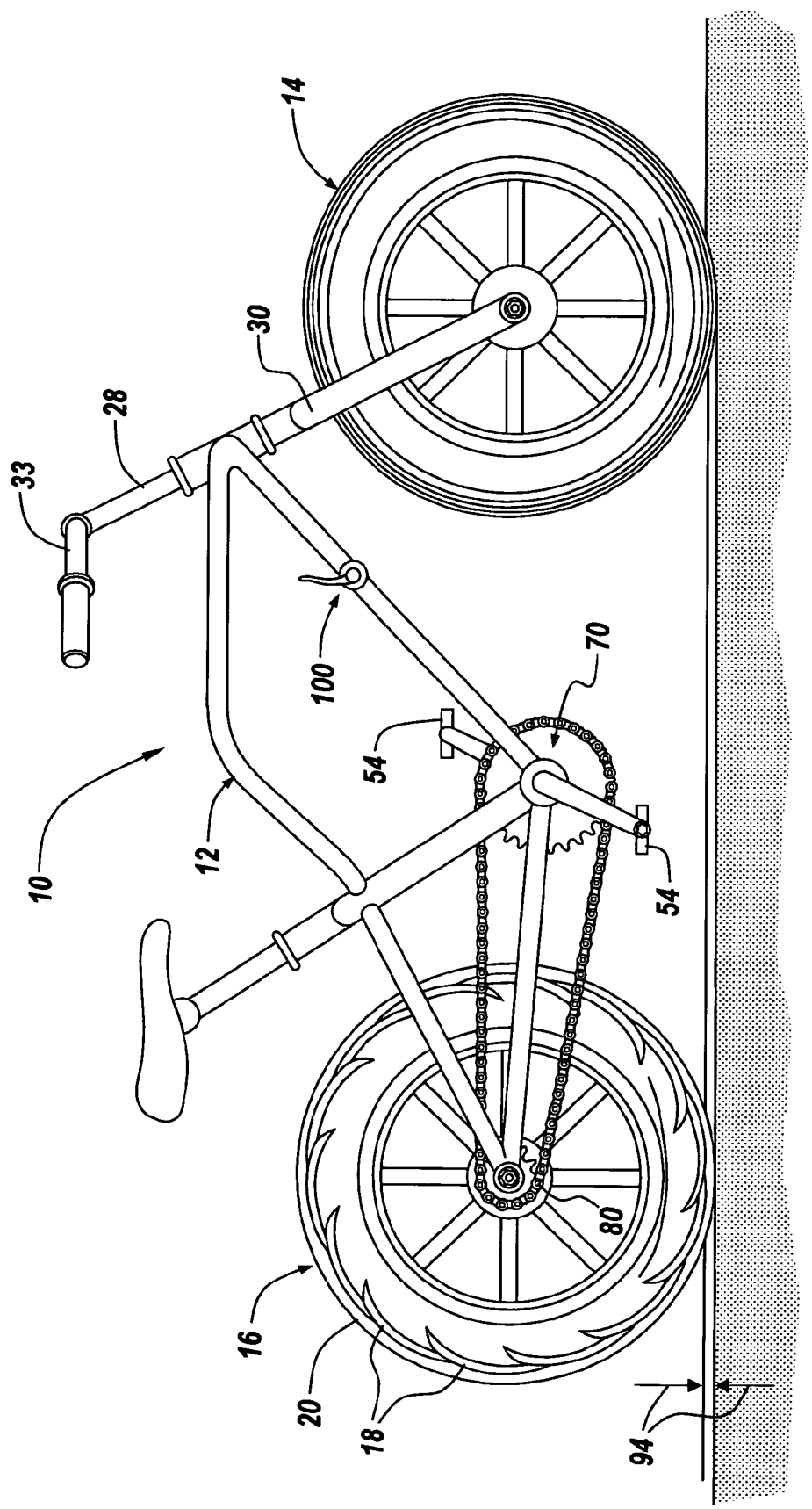
FIG. 3 is a side view of the sand-rideable bicycle of FIG. 1 illustrating the limited depth to which the tires of the bicycle penetrate into even soft sand, thereby to permit the riding of the bicycle on soft sand.

Referring now to FIG. 3, again in which like elements have like reference characters between FIGS. 1 and 2, here it can be seen that front tire 14 only depresses the surface 90 of loosely packed sand 92 by an amount indicated by double ended arrow 64, with the indenting of the soft sand being very slight indeed. It is the purpose of the balloon tires to make the bicycle sand peddleable by a wide variety of individuals without undo stress and to get the bicycle up and started easily so that the gyroscopic forces generated by the wheel rotating permit easy balancing.

As will be discussed hereinafter, the amount of depression of the sand varies by the weight of the rider and the composition and density of the sand. However it has been found with tires having a pressure of 15 pounds and a width of between 4 and 8 inches, even for a 300 pound individual result in minimal depression of the tires into the sand, making possible peddling of the bicycle without mechanized assistance.

In one of the tests described hereinafter, the distance that the tires penetrate into the sand, namely the distance described by arrow 94, is so slight that only a slight trace on the sand is seen after the bicycle has been ridden across the sand.

Of course, the ease with which the bicycle is peddled through the sand is dependent upon the gear ratio between sprocket 70 and sprocket 80, which in one embodiment in low gear is approximately 1.5:1. The drive sprocket and the rear mounted sprocket gear are shifted from one gear to another in a conventional manner and is therefore not shown. However, a gear shift is diagrammatically illustrated at 100 to be able to shift the gears through associated cables and the like when the rider goes for instance from an asphalt or concrete walkway to sand.

Figure 4:
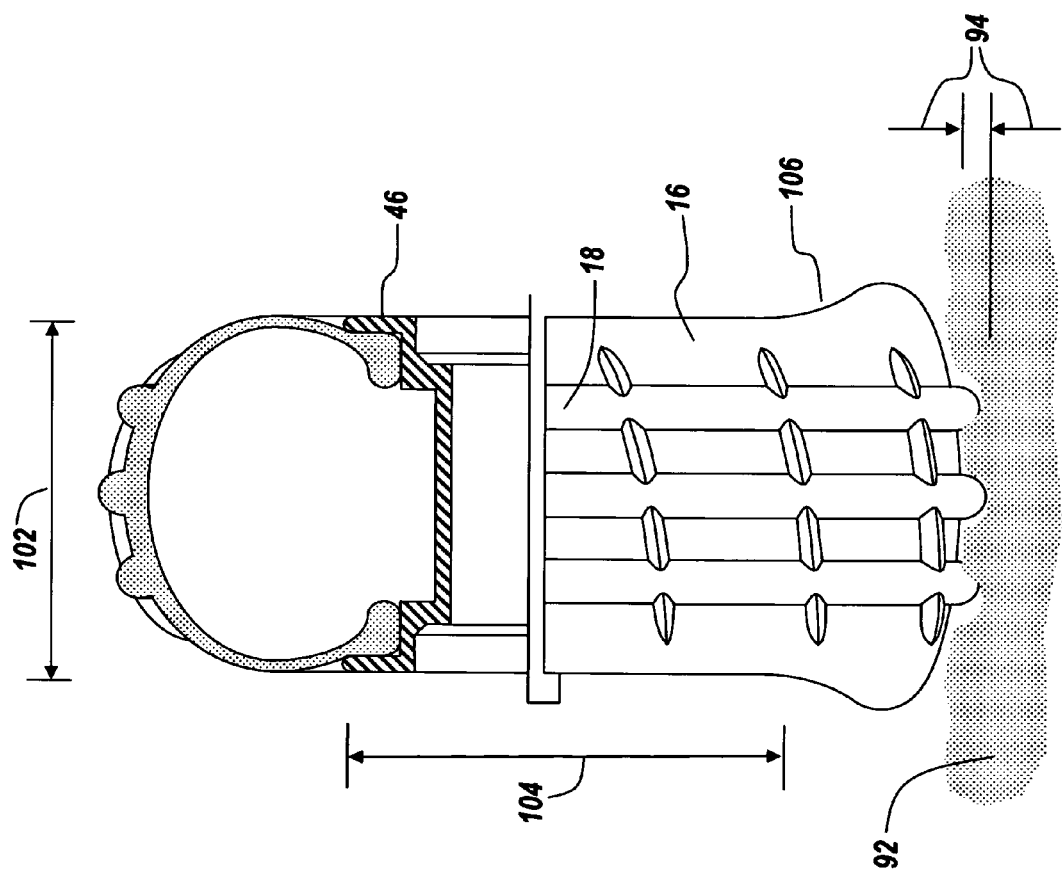

As will be discussed hereinafter, it has been found that it is possible to easily peddle the subject sand-rideable bicycle due to the aforementioned balloon tires, one of which is shown in FIG. 4. Here as can be seen the balloon tire has a width as indicated by double ended arrow 102 of between 8 and 10 inches, with the wheel having a hub diameter as indicated by double ended arrow 104 of 17 inches.

Hub 46 is illustrated in partial cross section to show its attachment to balloon tire 16, with the tire in one embodiment being under inflated to approximately 10 pounds such that the footprint of the tire is expanded by the bulbous portion 106 which expands the footprint of the tire on the sand.

The extent to which the rear tire sinks into the sand is illustrated by the aforementioned double ended arrows 94, it being understood that the inflation of the tires may be adjusted to provide a sufficient footprint for easy peddling based on the weight of the rider.

While the weight of the rider is paramount in the degree to which the bicycle sinks into the sand, not only is the inflation of the tires critical in terms of sand penetration, but also the structure of which the frame is made contributes to how heavy the bicycle is, regardless of the rider's weight.

In one embodiment the fork is made out of carbon fiber for the weight control, whereas frame components may be made of titanium to increase strength and rigidity while at the same time minimizing the amount of weight contributed by the frame itself.

It is noted that the ease with which the subject bicycle can be peddled is not only due to the balloon tires and the expanded footprint due to under inflation, the bifurcated frame assembly spaces peddles 54 in such a manner that an expanded peddling stance is provided. This expanded peddling stance makes peddling more natural, making bicycle propulsion easier.

Note the inclusion of the drive sprocket within the frame. This protects the drive sprocket from picking up loose sand assuming shielding is provided around the sprocket and anchored to this frame. Thus, the frame provides a framework from which sand shielding can be secured, thus making the sand-rideable bicycle somewhat more impervious to sand getting into the gears and gear chain.

Double Drive Wheels

Figure 5:
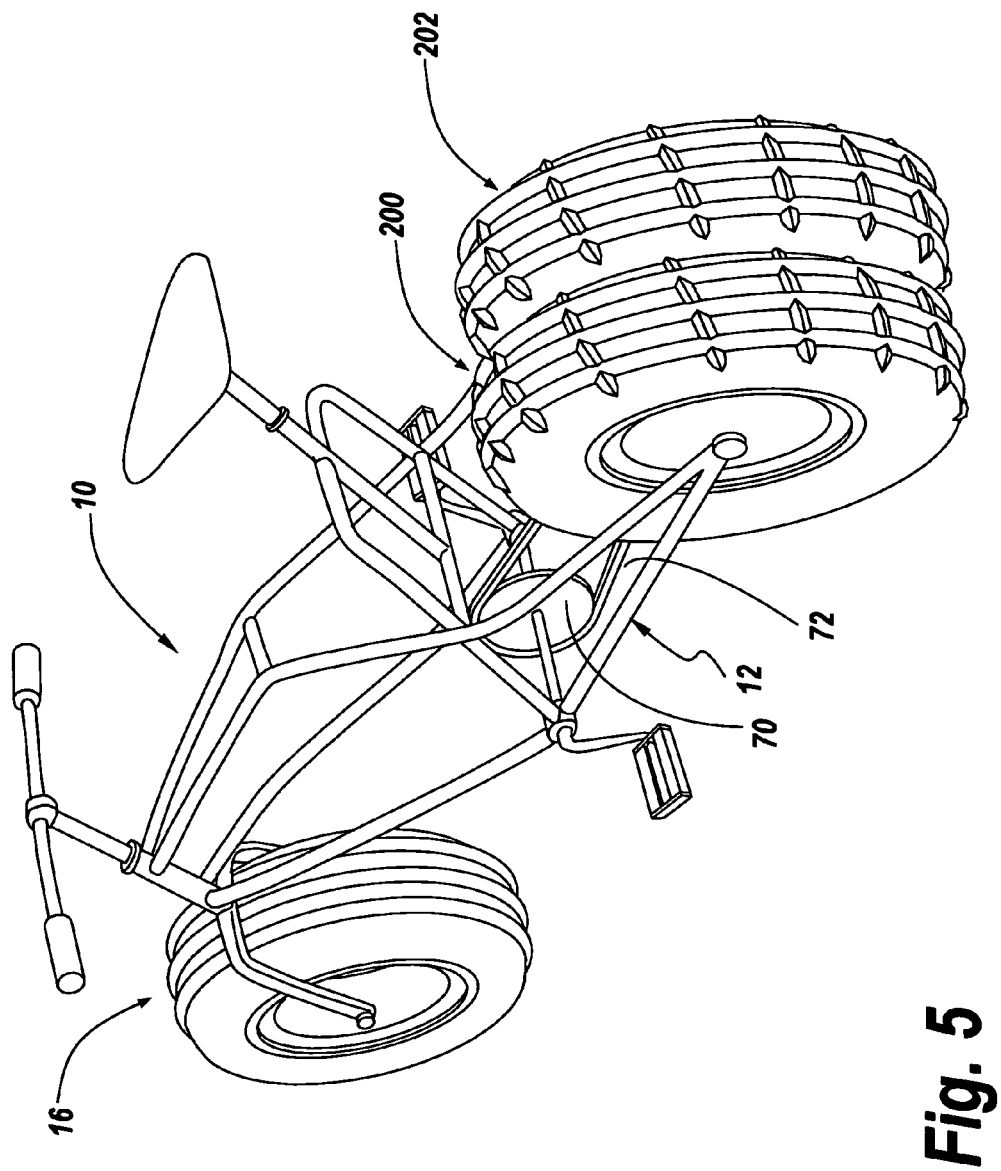
FIG. 5 is an isometric view of the subject bicycle with a pair of side-by-side rear tires; and, FIG. 6 is a cross sectional and diagrammatic illustration of the side-by-side rear tire structure of FIG. 5 showing a sprocket therebetween.

Referring now to FIG. 5, a double drive wheel version of the subject invention is shown in which bicycle 10 is shown with a pair of wheels 200 and 202 mounted to frame 12. The side-by-side mounting of the tires provides a number of advantages. First, there is an increased footprint, which again serves the purpose of preventing sand penetration that makes the bike rise up and float over the sand.

Secondly, the side-by-side double tire version provides for increased stability due to the wide stance of the tires, making balancing easier, especially for those older individuals having balance problems. The side-by-side double wheel version permits easy mounting of the bicycle when stationary, and provides stability regardless of forward motion which would create gyroscopic stability.

Thus, mounting the bicycle at extremely low forward speeds is possible, even for the most inexperienced bike rider or those experiencing balance problems.

Additionally, the increased footprint of the two tire version provides better traction in soft sand for effortless propulsion such that not only do the balloon tires cause the bicycle to ride up on top of the sand, they also provide both lateral stability and the ability to pedal the bicycle regardless of the softness of the sand.

Figure 6:
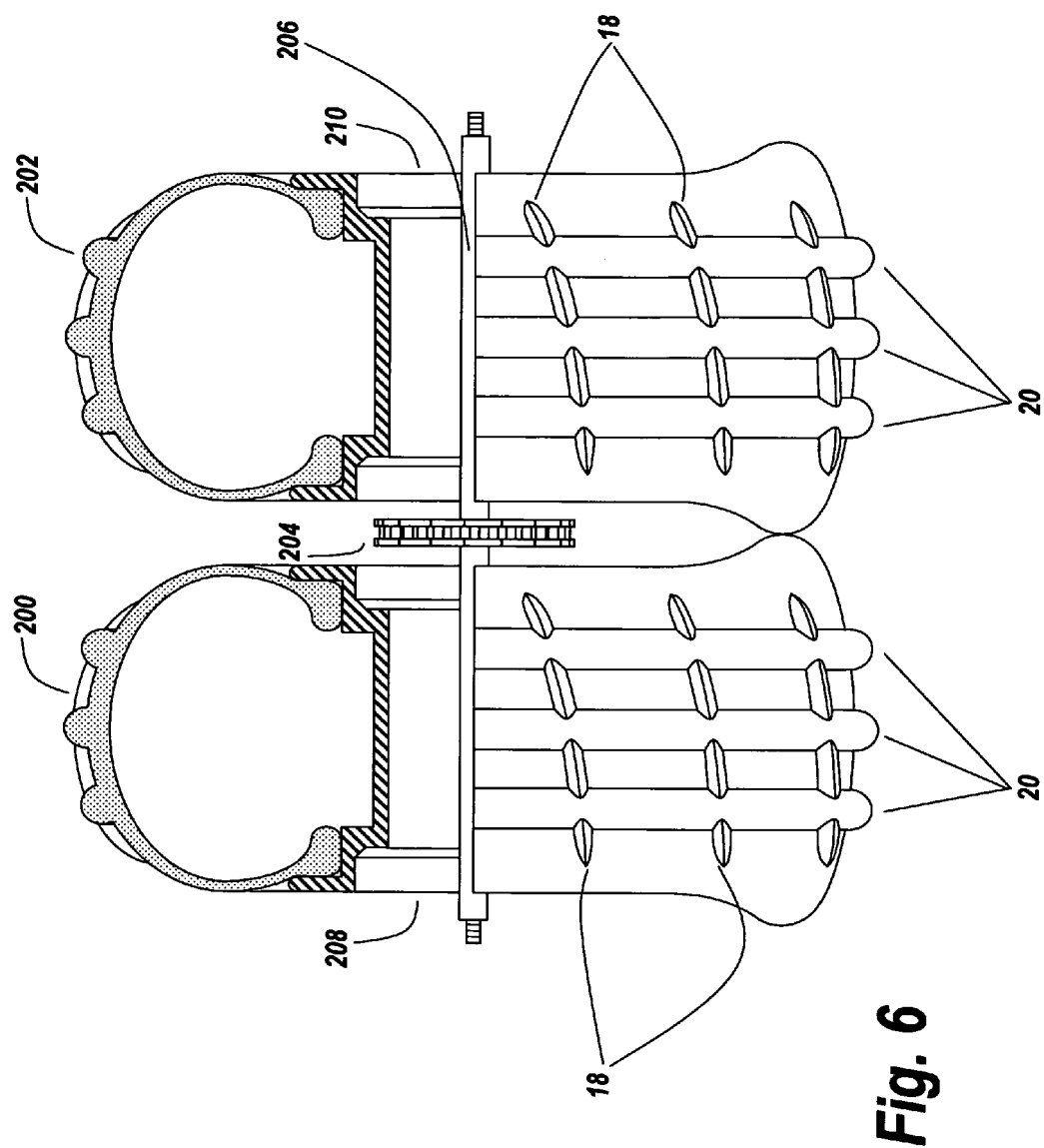

As shown in FIG. 5, the bifurcated structure of frame 12 permits location of drive sprocket 70 in the center of the frame that permits drive chain 72 to go between tires 200 and 202 where, as illustrated in FIG. 6, a rear drive sprocket 204 is located on a shaft 206 attached to the hubs 208 and 210 of respective tires.

The centered drive provides a centered torque system that even further aids in balance and pedaling stability.

It is noted that balloon tires 200 and 202 are provided with the laterally running ridges 18 such as discussed in FIG. 1. In order to make the bicycle rideable over city streets, sidewalks and the like, circumferential ridges 20 are provided to extend above the laterally running ridges to make street riding comfortable.

It should be noted that the circumferential ridges also aid in lateral stability such that when combined with the circumferential ridges on the front tire, provide good tracking in much the same way as a boat keel.

In summary, the sand rideable bike may be provided with a double rear tire assembly that makes the bike float over even loose sand with a type of stability not available on any conventional bicycle, much less one having balloon tires and designed for effortless sand pedaling.

Moreover, the utilization of the side-by-side tires provides for a more stabilized bike mounting and a diminution of the balancing requirements for an individual seeking to pedal the bicycle over sand.

Thus individuals who might be challenged from a balance point of view can none the less enjoy bicycling both on solid surfaces and over loose sand, regardless of balance impairments. This of course is critical when such balance-impaired individuals seek to bicycle over loose granular surfaces such as sand, gravel and the like, with the added stability of the two rear tire configuration enhancing the sand rideability of the FIG. 1-4 embodiment.

What is now presented is one example of the size of the tires, the weight of the individuals and the penetration of the bike into sand to illustrate all of the factors that are combined to calculate the amount that the bicycle sinks into the sand, and thus the ease of peddling. All of these factors are variable based on the weight of the individual which is one of the factors.

TABLE I

| TEST RESULTS | |
| --- | --- |
| Bicycle Weight | 50 lbs. |
| Tire Size (Outside diameter) | 27" |
| Tire Width (Unloaded) | 6.3" |
| Tire Pressure | 15 lbs. |
| Footprint (riderless) | 6" × 9" |
| Footprint (210 lb. rider) | 8" × 12" |
| Loose Sand Depression (210 lb. rider) | ½ inch |

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A non-motorized sand-rideable bicycle comprising:
an open frame having an expanded width for accommodating oversized tires,
wherein the open frame comprises laterally spaced struts,
a front yoke rotateably supported on a forward portion of said frame,
said open frame including spaced-apart rear extension arms;
a plurality of balloon tires comprising a front balloon tire rotateably attached to said yoke, and a pair of spaced apart rear balloon tires disposed between and rotateably attached to said spaced-apart rear extension arms;
a drive sprocket rotateably attached to said frame, said drive sprocket being disposed within said open frame between said laterally spaced struts;

pedals attached to said drive sprocket and laterally disposed on opposing sides of said laterally spaced struts of said open frame;

a rear sprocket between said spaced apart rear balloon tires coupled to drive said rear tires;

a drive chain coupled between said drive sprocket and said rear sprocket;

a seat attached to said expanded open frame;

wherein a width of said front balloon tire and said pair of spaced apart rear balloon tires being of a size and inflated to a pressure to ride up and over loose sand, such that said sand-rideable bicycle can be started with minimal effort by an individual on said seat and such that forward motion of said bicycle on said loose sand is not impeded by a minimal penetration of said front balloon tire and said pair of spaced apart rear balloon tires into said loose sand;

wherein each rear balloon tire of said pair of spaced apart rear balloon tires includes a plurality of transverse exterior ribs disposed about a circumference of each said rear balloon tire, and further including a plurality of annular ribs disposed around a periphery of each said rear balloon tire that extends radially above said plurality of transverse exterior ribs so that said plurality of transverse ribs do not touch a hard surface when the bicycle is driven over said hard surface, such that said bicycle may be ridden vibration-free over said hard surface with said annular ribs preventing said transverse exterior ribs from touching said hard surface; and wherein said plurality of transverse exterior ribs extend between each said annular rib of each said rear balloon tire and further extend outwardly toward each sidewall of each said rear balloon tire so as to extend the plurality of transverse ribs outwardly beyond each outer-most annular rib of each said rear balloon tire.

2. The non-motorized sand-rideable bicycle of claim 1, wherein said open frame has a diamond shaped structure.

3. The non-motorized sand-rideable bicycle of claim 2, wherein said pedals are spaced to either side of said open frame, said open frame requiring the lateral spacing of said pedals.

4. The non-motorized sand-rideable bicycle of claim 3, wherein the spacing of said pedals is such that the said spacing is at least as great as the width of one of said balloon tires.

5. The non-motorized sand-rideable bicycle of claim 4, wherein the spacing of said pedals is at least equal to a side-to-side width of said rear balloon tires.

6. The non-motorized sand-rideable bicycle of claim 1, wherein a first portion of said frame is made of metal and a second portion of said frame is made of a non-metal.

7. The non-motorized sand-rideable bicycle of claim 6, wherein said second portion is made of carbon fiber.

8. The non-motorized sand-rideable bicycle of claim 7, wherein said first portion of said frame is made of titanium.

\* \* \* \* \*